United States Patent [19]

Nakamura et al.

[11] Patent Number: 5,656,204
[45] Date of Patent: Aug. 12, 1997

[54] OPTICAL ELEMENT AND PROCESS FOR PRODUCING THE SAME

[75] Inventors: Shigetoshi Nakamura; Hiroaki Moriyama, both of Minami-ashigara, Japan

[73] Assignee: Fuji Xerox Co., Ltd., Tokyo, Japan

[21] Appl. No.: 193,860

[22] Filed: Feb. 9, 1994

[30] Foreign Application Priority Data

Feb. 12, 1993 [JP] Japan .................... 5-046154
Feb. 12, 1993 [JP] Japan .................... 5-046155
Feb. 12, 1993 [JP] Japan .................... 5-046156

[51] Int. Cl.$^6$ .................. F21V 9/00; H01S 3/17; B01J 13/00
[52] U.S. Cl. .................. 252/582; 252/315.01; 252/315.2; 252/315.6; 372/40; 501/12
[58] Field of Search ................ 252/315.01, 315.2, 252/315.6, 583, 582; 372/40; 501/12

[56] References Cited

U.S. PATENT DOCUMENTS

| | | | |
|---|---|---|---|
| 2,484,284 | 10/1949 | Glassbrook et al. | 252/315.6 X |
| 3,474,039 | 10/1969 | Newing, Jr. | 252/582 |
| 3,640,093 | 2/1972 | Levene et al. | 65/134 |
| 4,344,992 | 8/1982 | Ramachandran | 427/430.1 |
| 4,814,211 | 3/1989 | Buckley et al. | 501/12 X |
| 4,851,373 | 7/1989 | Hench et al. | 501/12 |
| 4,965,434 | 10/1990 | Nomura et al. | 501/12 X |
| 4,988,646 | 1/1991 | Mukherjee | 501/12 X |
| 5,068,208 | 11/1991 | Haun et al. | 501/12 |
| 5,272,240 | 12/1993 | Haruvy et al. | 528/10 |

FOREIGN PATENT DOCUMENTS

| | | |
|---|---|---|
| 59-9499 | 3/1984 | Japan . |
| 62-100428 | 5/1987 | Japan . |
| 63-151623 | 6/1988 | Japan . |
| 2-188441 | 7/1990 | Japan . |
| 2-302329 | 12/1990 | Japan . |
| 3-33031 | 2/1991 | Japan . |
| 3-102331 | 4/1991 | Japan . |
| 4-7524 | 1/1992 | Japan . |

OTHER PUBLICATIONS

Maki Nakamura, et al.—Preparation of Organic Dye–Doped $SiO_2$ Gels by the Sol–Gel Process and Evaluation of Their Optical Non–Linearity, *Journal of Non–Crystalline Solids* 135(1991)1–7.

Kazunori Matsui et al.—Micellar Formation of Sodium Dodecyl Sulfate in Sol–Gel Glasses Probed by Pyrene Fluorescence, *J. Phys. Chem.* 1991, 95, 976–979.

Y. Kobayashi, et al.—A Transparent Alumina Film Doped with Laser Dye and its Emission Properties, *Journal of Non–Crystalline Solids* 105(1988)198–200.

R. Reisfeld—Criteria and Prospects of New Lasers Based on Fluorescent Dyes in Glasses, *Journal De Physique* vol. 48, p.C7–423–C7–426 (1987).

*Primary Examiner*—Richard D. Lovering
*Attorney, Agent, or Firm*—Oliff & Berridge

[57] ABSTRACT

An optical element comprising (i) a matrix having an Si—O covalent bond unit, wherein at least part of the silicon atoms of said Si—O covalent bond unit is covalently bonded to an aliphatic hydrocarbon group containing not more than 4 carbon atoms, and (ii) at least one functional material selected from the group consisting of an organic material showing a nonlinear optical effect, a material showing a refractive index-regulating action, and an organic dye for laser oscillation, said functional material being present within said matrix. A functional group is stably held in the matrix and fully manifests its function in the matrix.

17 Claims, 2 Drawing Sheets

OPTICAL ELEMENT AND PROCESS FOR PRODUCING THE SAME

FIELD OF THE INVENTION

This invention relates to an optical element comprising a functional material dispersed in a specific matrix and to a process for producing the same. More particularly, it relates to an optical element comprising a functional material dispersed in a matrix having a covalent bond unit of a silicon atom and an oxygen atom (hereinafter referred to as an Si—O covalent bond unit) which is obtained by hydrolysis of a silane derivative according to a sol-gel process.

BACKGROUND OF THE INVENTION

With the advancement of information processing systems, functional materials performing various functions, such as nonlinear optical effects, photochromism and the like, have been searched for in pursuit of development of an optical theory element, which is a fundamental technique for an optical computer, an optical switch, an optical memory, a tunable laser, etc. Known functional materials in the field of the optical industry include inorganic ferroelectric substances, e.g., $LiNbO_3$, $BaTiO_3$, and $KH_2PO_4$; quantum well semiconductors using GaAs, etc.; organic single crystals of 4'-nitrobenzylidene-3-acetamino-4-methoxyaniline (MNBA), 2-methyl-4-nitroaniline (MNA), etc.; low-molecular dyes, e.g., spiropyran and furylfulgide; and conjugated organic high molecular polymers, e.g., polydiacetylene and polyarylene-vinylene. Studies have been continued particularly on organic functional materials because of their structural diversity as compared with inorganic materials, and a number of organic functional materials have hitherto been proposed.

In general, inorganic materials involve complicated processes, such as sputtering and melt sintering and require large-sized equipment for making elements. On the contrary, organic materials do not require complicated equipment but meet difficulty in obtaining a sufficiently large single crystal for practical use. Besides, organic materials were difficult to fabricate into an element due to their poor mechanical strength.

It has been suggested to add a low-molecular dye to a high molecular polymer matrix. However, the effect of a low-molecular dye held in a high polymer matrix film does not last long because the low-molecular dye undergoes decomposition by the influences of impurities, and the like. Further, where an element using a high polymer matrix is connected to a glass waveguide exemplified by optical fiber, there occur problems, such as insertion loss arising from a difference in refractive index and difficulty in connecting the two. The waveguide loss in the element itself is larger than in glass materials.

In order to solve the above problems, it has been proposed to immobilize an organic functional compound in a silica gel matrix by a sol-gel process to thereby obtain a functional composite material composed of an inorganic material and an organic material excellent in light transmission and weathering resistance (see JP-A-2-188441, JP-A-3-33031 (the term "JP-A" as used herein means an "unexamined published Japanese patent application"), and *J. Non-cryst. Solid*, Vol. 135, p. 1 (1991)).

However, a tetraalkoxysilane which has been employed as a matrix-forming substance in a conventional sol-gel process is apt to develop cracks on drying of a gel, and a sol solution thereof, when coated on a substrate, fails to provide a film with a sufficient thickness. Where a dye is to be incorporated into an inorganic silica gel matrix using a tetraalkoxysilane, it is difficult to incorporate a sufficiently high concentration of a dye because addition of a high concentration of a dye results in agglomeration of the dye particles due to poor compatibility with the matrix. According to JP-A-2-188441, dispersibility of a dye in a sol solution may be improved by ultrasonic wave application. However, the dye still undergoes agglomeration since the solvent of the sol solution, such as an alcohol, vaporizes during gelation and drying of the sol solution. Therefore, the improving effect is still insufficient. Further, the dye is influenced by the strong polar field of a residual silanol group, a siloxane bond, etc. in a gel so that it cannot fully display its function. Addition of a surface active agent has been suggested as a means for improving compatibility between the inorganic matrix and an organic dye and for alleviating the influence of the polar field (see JP-A-3-33031). Further, *J. Phys. Chem.*, Vol. 95, p. 976 (1991) reports that a surface active agent forms a micelle-like aggregate in a silica gel matrix, demonstrating reduction of polarity around a dye added thereto as a result of fluorometry using pyrene as a probe. However, a surface active agent is not always stable in a solid and tends to lose its effect by heat or with time.

SUMMARY OF THE INVENTION

An object of the present invention is to provide a highly functional optical element which can be used as a crack-free film having a sufficient thickness for use as an optically functional material and a process for producing the same.

Another object of the present invention is to provide an optical element excellent in fabricability, mechanical strength, environmental resistance, and stability with time and a process for producing the same.

A further object of the present invention is to provide an optical element comprising an inorganic matrix in which a functional material is stably held and can fully manifest its function and a process for producing the same.

The present inventors have extensively investigated silane compounds which may constitute a matrix for holding a functional material. As a result, it has now been found that a silane derivative obtained by substituting part of four hydrolyzable groups of a conventional silane compound with a non-hydrolyzable group having not more than 4 carbon atoms can be used as a starting material of a sol-gel process to provide a matrix which hardly develops cracks and forms a film with a sufficient thickness on a substrate. The present invention has been completed based on this finding.

The above objects of the present invention are accomplished by an optical element comprising a matrix having an Si—O covalent bond unit, wherein at least part of the silicon atoms of said Si—O covalent bond unit is covalently bonded to a substituted or unsubstituted and saturated or unsaturated aliphatic hydrocarbon group containing not more than 4 carbon atoms, and (ii) at least one optically functional material selected from the group consisting of an organic material showing a nonlinear optical effect, a material showing a refractive index-regulating action, and an organic dye for laser oscillation, said optically functional material being present within said matrix.

DETAILED DESCRIPTION OF THE INVENTION

Figure 1:
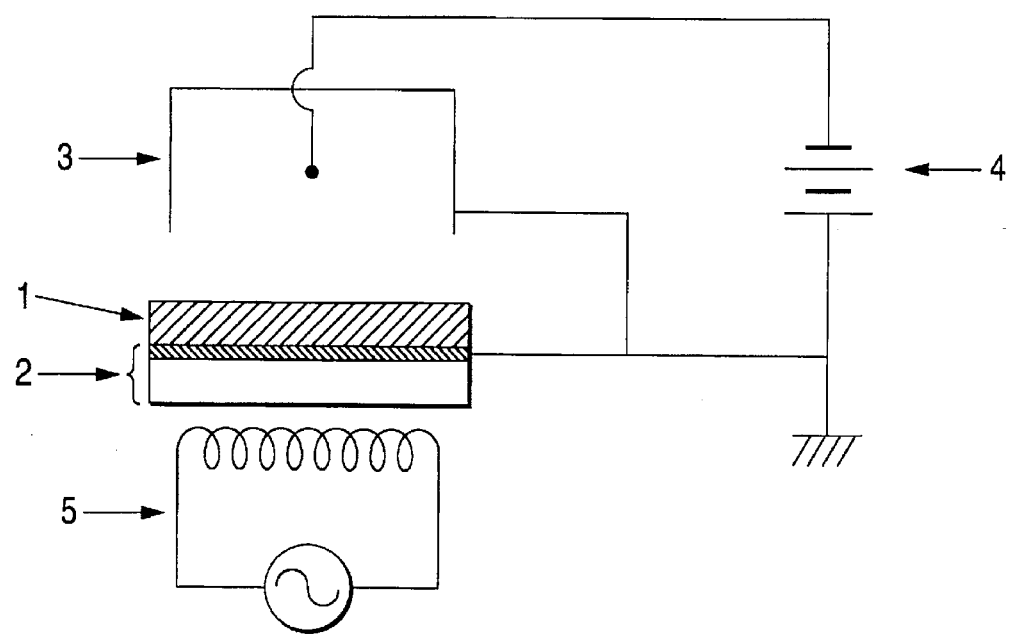
FIG. 1 is a schematic view of a corona discharger for poling which can be used for production of an optical element according to the present invention.

A matrix material comprising an Si—O covalent bond unit is classically known as glass. It is recently known that such a matrix can be formed by hydrolysis of a silane derivative. However, a matrix of this kind is generally brittle and develops many cracks when, for example, coated on a substrate to form a film. According to the present invention, cracking of a matrix comprising Si—O covalent bonds can be reduced by introducing an organic substituent into the matrix. The organic substituent present in the matrix to impart softness is a substituted or unsubstituted and saturated or unsaturated aliphatic hydrocarbon group containing not more than 4 carbon atoms inclusive of a carbon atom covalently bonded to the silicon atom of the matrix.

The matrix having the above-mentioned organic substituent can be obtained by hydrolyzing a hydrolyzable silane derivative having such an organic substituent as a non-hydrolyzable group in addition to hydrolyzable groups.

Such a matrix-forming substance which can be used for formation of the matrix according to the present invention includes a hydrolyzable silane derivative represented by formula (I):

$$R^1SiX^1{}_3 \quad (I)$$

wherein $R^1$ represents a substituted or unsubstituted and saturated or unsaturated aliphatic hydrocarbon group having not more than 4 carbon atoms (inclusive of the number of carbon atoms in the substituents if any); and $X^1$ represents an alkoxyl group, a halogen atom or an isocyanate group.

$R^1$ preferably has not more than 3 carbon atoms.

Examples of a substituent of $R^1$ include a halogen atom, an amino group, or cyano group.

The alkoxyl group for $X^1$ preferably has not more than 3 carbon atoms.

Specific examples of the hydrolyzable silane derivative of formula (I) are shown below. Specific examples of the organic substituent present in the matrix will be apparent from these examples.

$CH_3SiCl_3$,
$CH_3Si(NCO)_3$,
$CH_3Si(OCH_3)_3$,
$CH_3Si(OCH_2CH_3)_3$,
$CH_3Si(O(CH_2)_2CH_3)_3$,
$CH_3Si(OCH(CH_3)_2)_3$,
$CH_3Si(O(CH_2)_3CH_3)_3$,
$CH_3Si(OC(CH_3)_3)_3$,
$ClCH_2Si(OCH_2CH_3)_3$,
$CH_3CH_2SiCl_3$,
$CH_3CH_2Si(OCH_3)_3$,
$CH_3CH_2Si(OCH_2CH_3)_3$,
$CH_3CH_2Si(O(CH_2)_2CH_3)_3$,
$CH_3CH_2Si(OCH(CH_3)_2)_3$,
$CH_3CH_2Si(O(CH_2)_3CH_3)_3$,
$CH_3CH_2Si(OC(CH_3)_3)_3$,
$CH_2=CHSi(OCH_3)_3$,
$CH_2=CHSi(OCH_2CH_3)_3$,
$CH_2=CHSi(OC(CH_3)_3)_3$,
$ClCH_2CH_2Si(OCH_2CH_3)_3$,
$CH_3(CH_2)_2Si(OCH_3)_3$,
$Br(CH_2)_3Si(OCH_3)_3$,
$CH_2=CHCH_2Si(OCH_3)_3$,
$CH_2=CHCH_2Si(OCH_2CH_3)_3$,
$Cl(CH_2)_3Si(OCH_2CH_3)_3$,
$Cl(CH_2)_3Si(OCH_3)_3$,
$CH_3(CH_2)_3Si(OCH_3)_3$,
$H_2N(CH_2)_3SiCl_3$,
$H_2N(CH_2)_3Si(OCH_3)_3$,
$H_2N(CH_2)_3Si(OCH_2CH_3)_3$,
$NC(CH_2)_2Si(OCH_3)_3$,
$NC(CH_2)_2Si(OCH_2CH_3)_3$,
$H_3CO(CH_2)_3Si(OCH_3)_3$,
$CF_3(CH_2)_2Si(OCH_3)_3$,
$CF_3(CH_2)_2Si(OCH_2CH_3)_3$

Of them, preferred examples of the hydrolyzable silane derivative of formula (I) are shown below.
$CH_3Si(OCH_3)_3$,
$CH_3Si(OCH_2CH_3)_3$,
$CH_3CH_2Si(OCH_3)_3$,
$CH_3CH_2Si(OCH_2CH_3)_3$,
$CH_3(CH_2)_2Si(OCH_3)_3$,
$CH_2=CHCH_2Si(OCH_3)_3$,
$CH_2=CHCH_2Si(OCH_2CH_3)_3$,
$CF_3(CH_2)_2Si(OCH_3)_3$,
$CF_3(CH_2)_2Si(OCH_2CH_3)_3$ The silane derivatives of formula (I) may be used either individually or in combination of two or more thereof.

When the silane derivative of formula (I) is hydrolyzed, the alkoxyl group, halogen atom or isocyanate group as represented by $X^1$ is easily released because of relatively low energy of bonding to a silicon atom. The silicon atom thus having a free bond is bonded to other silicon atoms via an oxygen atom to form an Si—O covalent bond. The resulting matrix is not uniform and is difficult to represent by way of a general formula. It is considered that the matrix sometimes lacks an Si—O bond in parts.

On the other hand, the organic substituent bonded to a silicon atom at the carbon atom thereof is not easily split off by hydrolysis because of its high bonding energy to a silicon atom and remains in the resulting matrix and as a result the bonds in the matrix (the bonds in siloxane polymer constituting the matrix) are reduced. It is this moiety that imparts softness to the matrix.

If desired, the silane derivative of formula (I) may be used either alone or in combination with at least one hydrolyzable silane derivative selected from those represented by formulae (II), (III) and (IV) and/or at least one hydrolyzable silane derivative selected from those represented by formulae (V) and (VI):

$$R^2SiX^2{}_3 \quad (II)$$

$$\begin{array}{c} R^3 \\ \phantom{R}\diagdown \\ \phantom{XXX}SiX^3{}_2 \\ \phantom{R}\diagup \\ R^4 \end{array} \quad (III)$$

$$\begin{array}{c} R^6 \\ | \\ R^5\!-\!SiX^4 \\ | \\ R^7 \end{array} \quad (IV)$$

wherein $X^2$, $X^3$, and $X^4$ each represent an alkoxyl group, a halogen atom or an isocyanate group; $R^2$, $R^3$, and $R^5$ each represent a substituted or unsubstituted and saturated or unsaturated aliphatic hydrocarbon group containing not less than 5 carbon atoms (inclusive of the number of carbon atoms in the substituents if any) or a substituted or unsubstituted aryl group containing not less than 5 carbon atoms in total; and $R^4$, $R^6$, and $R^7$ each represent a substituted or unsubstituted and saturated or unsaturated aliphatic hydrocarbon group or a substituted or unsubstituted aryl group, or a couple of $R^3$ and $R^4$ or two of $R^5$, $R^6$ and $R^7$ may be taken together to form a carbonaceous ring or a heterocyclic ring.

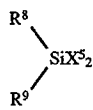  (V)

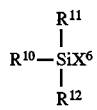  (VI)

wherein $X^5$ and $X^6$ each represent an alkoxyl group, a halogen atom or an isocyanate group; and $R^8$, $R^9$, $R^{10}$, $R^{11}$ and $R^{12}$ each represent a substituted or unsubstituted and saturated or unsaturated aliphatic hydrocarbon group containing not more than 4 carbon atoms in total.

The alkoxyl group for $X^2$, $X^3$ or $X^4$ preferably has not more than 3 carbon atoms.

Preferred examples of a substituent of $R^2$, $R^3$ or $R^5$ include a phenyl group, a methacryl group, a mercapto group, an epoxy group, a halogen atom, or an amino group.

$R^2$, $R^3$ or $R^5$ preferably has 8 to 18 carbon atoms.

$R^4$, $R^6$ or $R^7$ preferably has 1 to 6 carbon atoms.

Preferred examples of a substituent of $R^4$, $R^6$ or $R^7$ include a halogen atom, an amino group, or a cyano group.

The carbonaceous ring in formula (II) or formula (III) may have 3 to 5 carbon atoms.

The heterocyclic ring in formula (II) or formula (III) may have 6 carbon atoms and contain at least one hetero atom (e.g., an oxygen atom).

The alkoxyl group for $X^5$ or $X^6$ preferably has not more than 3 carbon atoms.

Examples of a substituent of $R^8$, $R^9$, $R^{10}$, $R^{11}$ or $R^{12}$ include a halogen atom, an amino group and a cyano group.

Specific examples of the silane derivatives represented by formulae (II) to (VI) are shown below.

Silane Derivatives (II):

$CH_3(CH_2)_4Si(OCH_3)_3$,
$CH_3(CH_2)_4SiCl_3$,
$CH_3(CH_2)_4Si(NCO)_3$,
$CH_3(CH_2)_5Si(OCH_3)_3$,
$CH_3(CH_2)_5Si(OCH_2CH_3)_3$,
$CH_3(CH_2)_5Si(O(CH_2)_2CH_3)_3$,
$CH_3(CH_2)_5Si(O(CH_2)_3CH_3)_3$,
$CH_3(CH_2)_5Si(OC(CH_3)_3)_3$,
$CH_3(CH_2)_7Si(OCH_3)_3$,
$CH_3(CH_2)_7Si(OCH_2CH_3)_3$,
$Br(CH_2)_8Si(OCH_3)_3$,
$CH_3(CH_2)_9Si(OCH_3)_3$,
$CH_3(CH_2)_9Si(OCH_2CH_3)_3$,
$CH_3(CH_2)_9Si(OC(CH_3)_3)_3$,
$CH_3(CH_2)_{11}Si(OCH_3)_3$,
$CH_3(CH_2)_{11}Si(OCH_2CH_3)_3$,
$CH_3(CH_2)_{11}Si(OC(CH_3)_3)_3$,
$CH_3(CH_2)_{15}Si(OCH_3)_3$,
$CH_3(CH_2)_{15}Si(OCH_2CH_3)_3$,
$CH_3(CH_2)_{15}Si(OC(CH_3)_3)_3$,
$CH_3(CH_2)_{17}Si(OCH_3)_3$,
$CH_3(CH_2)_{17}Si(OCH_2CH_3)_3$,
$CH_3(CH_2)_{17}Si(OC(CH_3)_3)_3$,
$H_2N(CH_2)_2NH(CH_2)_3Si(OCH_3)_3$,
$(H_3C)_2N(CH_2)_3Si(OCH_3)_3$,
$H_2N(CH_2)_3OC(CH_3)_2CH=CHSi(OCH_3)_3$,
$CH_2=CH(CH_2)_6Si(OCH_3)_3$,
$H_2N(CH_2)_{11}Si(OCH_3)_3$,
$CH_3COO(CH_2)_3Si(OCH_3)_3$,
$CH_2=CH(CH_2)_4Si(OCH_3)_3$,
$CH_2=CHCOO(CH_2)_3Si(OCH_3)_3$,
$F_3C(CF_2)_5(CH_2)_2Si(OCH_3)_3$,
$NCCH_2CH_2O-C(CH_2)_2-CH=CHSi(OCH_3)_3$,
$F_3C(CF_2)_5(CH_2)_2Si(OCH_2CH_3)_3$,
$(CH_3CH_2OOC)_2CH(CH_2)_2Si(OCH_2CH_3)_3$,

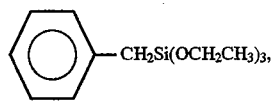

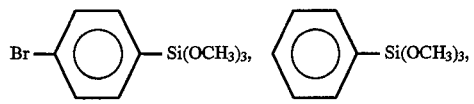

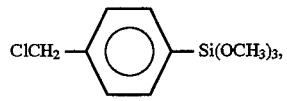

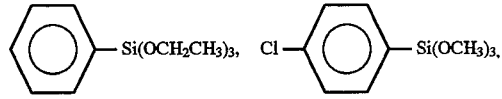

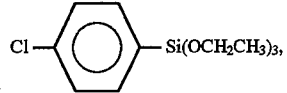

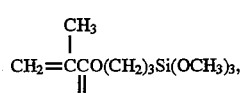

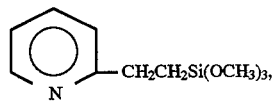

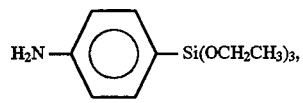

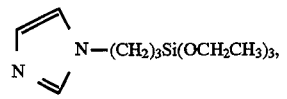

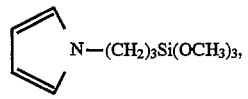

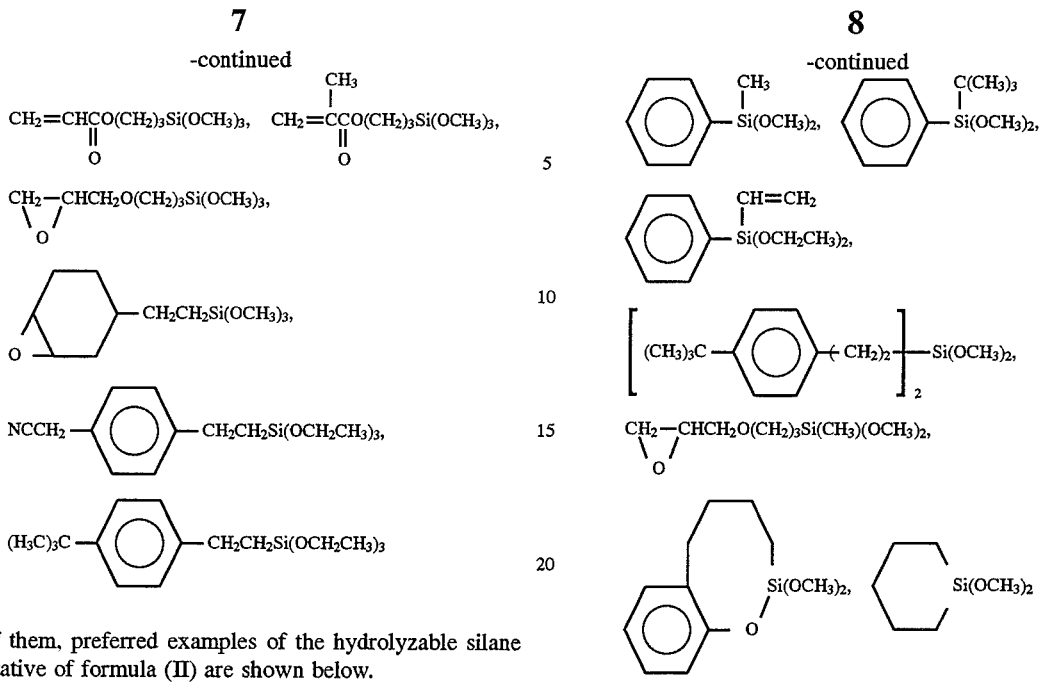

Of them, preferred examples of the hydrolyzable silane derivative of formula (II) are shown below.

$CH_3(CH_2)_7Si(OCH_3)_3$,
$CH_3(CH_2)_7Si(OCH_2CH_3)_3$,
$CH_3(CH_2)_{11}Si(OCH_3)_3$,
$CH_3(CH_2)_{11}Si(OCH_2CH_3)_3$,
$CH_3(CH_2)_{15}Si(OCH_3)_3$,
$CH_3(CH_2)_{15}Si(OCH_2CH_3)_3$,
$CH_3(CH_2)_{17}Si(OCH_3)_3$,
$CH_3(CH_2)_{17}Si(OCH_2CH_3)_3$,
$F_3C(CF_2)_5(CH_2)_2Si(OCH_3)_3$,
$F_3C(CF_2)_5(CH_2)_2Si(OCH_2CH_3)_3$

Silane Derivatives (III):

$CH_3(CH_2)_5Si(CH_3)(OCH_3)_2$,
$CH_3(CH_2)_5Si(CH_3)(OCH_2CH_3)_2$,
$CH_3(CH_2)_5Si(CH_3)(O(CH_2)_2CH_3)_2$,
$CH_3(CH_2)_5Si(CH_3)(O(CH_2)_3CH_3)_2$,
$CH_3(CH_2)_5Si(CH_3)(OC(CH_3)_3)_2$,
$CH_3(CH_2)_5Si(CH_2CH_3)(OCH_3)_2$,
$CH_3(CH_2)_7Si(CH_3)(OCH_2CH_3)_2$,
$CH_3(CH_2)_7Si(CH_3)(OCH_3)_2$,
$Br(CH_2)_8Si(CH_3)(OCH_3)_2$,
$CH_3(CH_2)_{21}Si(CH_3)(OCH_3)_2$,
$CH_3(CH_2)_9Si(CH_3)(OCH_3)_2$,
$CH_3(CH_2)_{11}Si(CH_3)(OCH_3)_2$,
$CH_3(CH_2)_{15}Si(CH_3)(OCH_3)_2$,
$CH_3(CH_2)_{17}Si(CH_3)(OCH_3)_2$
$CH_2=CH(CH_2)_6Si(CH_3)(OCH_3)_2$,
$F_3C(CF_2)_5(CH_2)_2Si(CH_3)(OCH_3)_2$,
$H_2N(CH_2)_{11}Si(CH_3)(OCH_3)_2$,
$H_3COO(CH_2)_3Si(CH_3)(OCH_3)_2$,
$CH_3COO(CH_2)_3Si(CH_3)(OCH_3)_2$,
$H_2N(CH_2)_3OC(CH_3)_2CH=CHSi(CH_3)(OCH_3)_2$,
$CH_2=CHCOO(CH_2)_3Si(CH_3)(OCH_3)_2$,

Of them, preferred examples of the hydrolyzable silane derivative of formula (III) are shown below.

$CH_3(CH_2)_7Si(CH_3)(OCH_2CH_3)_2$,
$CH_3(CH_2)_7Si(CH_3)(OCH_3)_2$,
$CH_3(CH_2)_{11}Si(CH_3)(OCH_3)_2$,
$CH_3(CH_2)_{17}Si(CH_3)(OCH_3)_2$,
$F_3C(CF_2)_5(CH_2)_2Si(CH_3)(OCH_3)_2$

Silane Derivatives (IV):

$CH_3(CH_2)_5Si(CH_3)_2OCH_3$,
$CH_3(CH_2)_5Si(CH_3)_2(OCH_2CH_3)$,
$CH_3(CH_2)_5Si(CH_3)_2(O(CH_2)_2CH_3)$,
$CH_3(CH_2)_5Si(CH_3)_2(O(CH_2)_3CH_3)$,
$CH_3(CH_2)_5Si(CH_3)_2(OC(CH_3)_3)$,
$CH_3(CH_2)_5Si(CH_2CH_3)_2(OCH_3)$,
$CH_3(CH_2)_5)_2Si(CH_3)(OCH_3)$,
$CH_3(CH_2)_5)_3SiOCH_3$,
$CH_3(CH_2)_7Si(CH_3)_2(OCH_3)$,
$CH_3(CH_2)_9Si(CH_3)_2(OCH_3)$,
$CH_3(CH_2)_{11}Si(CH_3)_2(OCH_3)$,
$CH_3(CH_2)_{17}Si(CH_3)_2(OCH_3)$,
$CH_2=CH(CH_2)_6Si(CH_3)_2(OCH_3)$,
$CH_2=CHCOO(CH_2)_3Si(CH_3)_2(OCH_3)$,
$CH_3COO(CH_2)_3Si(CH_3)_2(OCH_3)$,
$H_2N(CH_2)_{11}Si(CH_3)_2(OCH_3)$,
$F_3C(CF_2)_5(CH_2)_2Si(CH_3)_2(OCH_3)$,

-continued

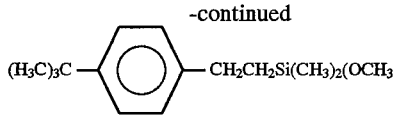

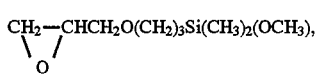

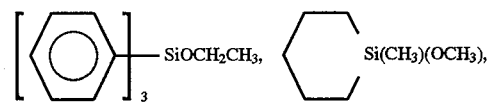

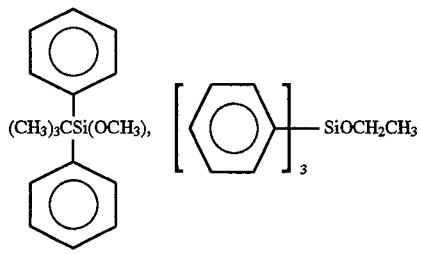

Of them, preferred examples of the hydrolyzable silane derivative of formula (IV) are shown below.
$CH_3(CH_2)_5Si(CH_3)_2OCH_3$,
$CH_3(CH_2)_5Si(CH_3)_2(OCH_2CH_3)$,
$(CH_3(CH_2)_5)_2Si(CH_3)(OCH_3)$,
$(CH_3(CH_2)_5)_3SiOCH_3$,
$CH_3(CH_2)_7Si(CH_3)_2(OCH_3)$,
$CH_3(CH_2)_{11}Si(CH_3)_2(OCH_3)$,
$CH_3(CH_2)_{17}Si(CH_3)_2(OCH_3)$,
$H_2N(CH_2)_{11}Si(CH_3)_2(OCH_3)$,
$F_3C(CF_2)_5(CH_2)_2Si(CH_3)_2(OCH_3)$,

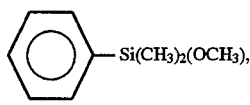

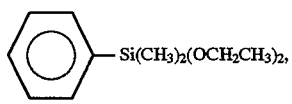

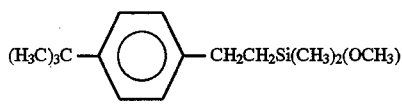

Silane Derivatives (V):
$(CH_3)_2SiCl_2$,
$(CH_3)_2Si(NCO)_2$,
$(CH_3)_2Si(OCH_3)_2$,
$(CH_3)_2Si(OCH_2CH_3)_2$,
$(CH_3)_2Si(O(CH_2)_2CH_3)_2$,
$(CH_3)_2Si(OCH(CH_3)_2)_2$,
$(CH_3)_2Si(O(CH_2)_3CH_3)_2$,
$(CH_3)_2Si(OC(CH_3)_3)_2$,
$(CH_2CH_3)_2Si(OCH_3)_2$,
$(CH_2CH_3)_2SiCl_2$,
$(CH_2CH_3)_2Si(OCH_2CH_3)_2$,
$(CH_2CH_3)_2Si(O(CH_2)_2CH_3)_2$,
$(CH_2CH_3)_2Si(OCH(CH_3)_2)_2$,
$(CH_2CH_3)_2Si(O(CH_2)_3CH_3)_2$,
$(CH_2CH_3)_2Si(OC(CH_3)_3)_2$,
$(CH_2=CH)_2Si(OCH_3)_2$,
$(CH_2=CH)_2Si(OCH_2CH_3)_2$,
$(CH_3(CH_2)_2)_2Si(OCH_3)_2$ Of them, preferred examples of the hydrolyzable silane derivative of formula (V) are shown below.
$(CH_3)_2Si(OCH_3)_2$,
$(CH_3)_2Si(OCH_2CH_3)_2$,
$(CH_2CH_3)_2Si(OCH_3)_2$,
$(CH_2CH_3)_2Si(OCH_2CH_3)_2$,
$(CH_2=CH)_2Si(OCH_3)_2$,
$(CH_2=CH)_2Si(OCH_2CH_3)_2$ Silane Derivatives (VI):
$(CH_3)_3SiCl$,
$(CH_3)_3Si(NCO)$,
$(CH_3)_3Si(OCH_3)$,
$(CH_3)_3Si(OCH_2CH_3)$,
$(CH_3)_3Si(O(CH_2)_2CH_3)$,
$(CH_3)_3Si(OCH(CH_3)_2)$,
$(CH_3)_3Si(O(CH_2)_3CH_3)$,
$(CH_3)_3Si(OC(CH_3)_3)$,
$(CH_2CH_3)_3SiCl$,
$(CH_2CH_3)_3Si(OCH_3)$,
$(CH_2CH_3)_3Si(OCH_2CH_3)$,
$(CH_2CH_3)_3Si(O(CH_2)_2CH_3)$,
$(CH_2CH_3)_3Si(OCH(CH_3)_2)$,
$(CH_2CH_3)_3Si(O(CH_2)_3CH_3)$,
$(CH_2CH_3)_3Si(OC(CH_3)_3)$,
$(CH_3(CH_2)_2)_3Si(OCH_3)$,
$(CH_3(CH_2)_2)_3SiCl$ Of them, preferred examples of the hydrolyzable silane derivative of formula (VI) are shown below.
$(CH_3)_3Si(OCH_3)$,
$(CH_3)_3Si(OCH_2CH_3)$,
$(CH_2CH_3)_3Si(OCH_3)$,
$(CH_2CH_3)_3Si(OCH_2CH_3)$,
$(CH_3(CH_2)_2)_3Si(OCH_3)$ The silane derivative of formula (II), (III) or (IV) has a relatively long hydrocarbon group in the molecule thereof, which is expected to form an aggregate of hydrophobic moieties, i.e., micelles in the matrix. The micelles exhibit hydrophobic properties and function to improve compatibility of an organic molecule, such as a dye, if incorporated into the matrix, with the matrix.

The silane derivative of formula (II), (III) or (IV) is each preferably used in an amount of from 0.1 to 80 mol % based on the silane derivative of formula (I).

The silane derivative of formula (V) or (VI) possesses more non-splitting organic groups than in the silane derivative of formula (I). Where the silane derivative of formula (I) is used alone as a matrix-forming substance, one silicon atom in the resulting matrix has bonded thereto one organic substituent as understood from the structure shown in formula (I). On the contrary, where the silane derivative of formula (V) or (VI) is also used as a matrix-forming substance, one silicon atom in the resulting matrix has bonded thereto two or three organic substituents. In both cases, an oxygen atom is bonded to the remaining free bond(s) of the silicon atom to form an Si—O matrix.

The silane derivative of formula (V) or (VI) is each preferably used in an amount of from 0.1 to 20 mol % based on the silane derivative of formula (I).

If desired, the silane derivative of formula (I) may further be used in combination with at least one hydrolyzable metallic or non-metallic organic compound selected from those represented by formulae (VII) and (VIII):

$$M^1(X^7)_m L^1_{3-m} \quad \text{(VII)}$$

$$M^2(X^8)_n L^2_{4-n} \quad \text{(VIII)}$$

wherein $M^1$ represents a trivalent metallic or non-metallic atom which is selected from the group $III_A$, $III_B$ and $V_B$; $M^2$ represents a tetravalent metallic or non-metallic atom which is selected from the group $IV_A$, $IV_B$; $X^7$ and $X^8$ each represent a halogen atom, a hydroxyl group, an isocyanate group or an alkoxyl group; $L^1$ and $L^2$ each represent a chelating group or $R^{13}$—COO—, wherein $R^{13}$ represents an alkyl group; m represents 0 or an integer of from 1 to 3; and n represents 0 or an integer of from 1 to 4.

The alkoxyl group for $X^7$ or $X^8$ preferably has not more than 3 carbon atoms.

Examples of the chelating group of $L^1$ or $L^2$ are shown below. (M represents a coordinating metal.)

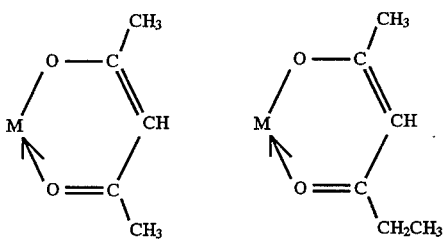

The alkyl group for $R_{13}$ has 1 to 18, preferably 1 to 2 carbon atoms.

The symbols "$III_A$, $III_B$, $V_B$, $IV_A$ and $IV_B$" as used herein means group members of the periodic table.

Specific examples of the metallic or non-metallic organic compound of formula (VII) are shown below.

Al(OCH$_3$)$_3$, Al(OCH$_2$CH$_3$)$_3$, Al(O(CH$_2$)$_2$CH$_3$)$_3$, Al(OCH (CH$_3$)$_2$)$_3$, Al(O(CH$_2$)$_3$CH$_3$)$_3$, Al(OC(CH$_3$)$_3$)$_3$, Al(OCH (CH$_3$)$_2$)$_2$(OC(CH$_3$)$_3$), Al(OC(CH$_3$)CHCOCH$_3$)$_3$, Al(OC (CH$_3$)CHCOCH$_2$CH$_3$)$_3$, Al(OC(CH$_3$)CHCOCH$_2$CH$_3$)$_2$ (OC(CH$_3$)CHCOCH$_3$),
AlCl$_3$,
Al(OCH(CH$_3$)$_2$)$_2$(OC(CH$_3$)CHCOCH$_2$CH$_3$), Al(OC (CH$_3$)$_3$)$_2$(OC(CH$_3$)CHCOCH$_3$), In(OCH$_3$)$_3$, In(OCH$_2$CH$_3$)$_3$, In(O(CH$_2$)$_2$CH$_3$)$_3$, In(OCH(CH$_3$)$_2$)$_3$, In(O(CH$_2$)$_3$CH$_3$)$_3$, In(OC(CH$_3$)$_3$)$_3$, As(OCH$_3$)$_3$, As(OCH$_2$CH$_3$)$_3$, As(O(CH$_2$)$_2$CH$_3$)$_3$, As(OC(CH$_3$)$_3$)$_3$, Ga(OCH$_3$)$_3$, Ga(OCH$_2$CH$_3$)$_3$, Ga(O(CH$_2$)$_2$CH$_3$)$_3$, Ga(OC(CH$_3$)$_3$)$_3$, B(OCH$_3$)$_3$, B(O(CH$_2$)$_3$CH$_3$)$_3$, B(OC (CH$_3$)$_3$)$_3$, Y(OCH$_3$)$_3$, Y(OCH$_2$CH$_3$)$_3$, Y(O(CH$_2$)$_3$CH$_3$)$_3$, Y(OOCCH$_3$)$_3$, Y(OC(CH$_3$)CHCOCH$_3$)$_3$, YCl$_3$, Fe(OCH$_3$)$_3$, Fe(O(CH$_2$)$_3$CH$_3$)$_3$, Fe(OC(CH$_3$)$_3$)$_3$

Of them, preferred examples of the metallic or non-metallic organic compound of (VII) are shown below.

Al(OC(CH$_3$)CHCOCH$_3$)$_3$, Al(OC(CH$_3$)$_3$)$_2$(OC(CH$_3$) CHCOCH$_3$), Y(OC(CH$_3$)CHCOCH$_3$)$_3$

Specific examples of the metallic or non-metallic organic compound of formula (VIII) are shown below.

Si(OCH$_3$)$_4$, Si(OCH$_2$CH$_3$)$_4$, Si(O(CH$_2$)$_2$CH$_3$)$_4$, Si(OCH (CH$_3$)$_2$)$_4$, Si(O(CH$_2$)$_3$CH$_3$)$_4$, Si(OC(CH$_3$)$_3$)$_4$, Si(OOCCH$_3$)$_4$, Si(OOCCH$_2$CH$_3$)$_4$, Si(NCO)$_4$, Ge(OCH$_3$)$_4$, Ge(O(CH$_2$)$_2$CH$_3$)$_4$, Ge(O(CH$_2$)$_3$CH$_3$)$_4$, Sn(OCH$_3$)$_4$, Sn(OCH(CH$_3$)$_2$)$_4$, Sn(O(CH$_2$)$_3$CH$_3$)$_4$, Ti(OCH$_3$)$_4$, Ti(OCH$_2$CH$_3$)$_4$, Ti(O(CH$_2$)$_2$CH$_3$)$_4$, Ti(OCH (CH$_3$)$_2$)$_4$, Ti(O(CH$_2$)$_3$CH$_3$)$_4$, Ti(OC(CH$_3$)$_3$)$_4$, Ti(OOCCH$_3$)$_4$, Ti(OOCCH$_2$CH$_3$)$_4$, Ti(O(CH$_2$)$_{16}$CH$_3$)$_4$, Ti(OCH$_2$CH(CH$_2$CH$_3$)(CH$_2$)$_3$CH$_3$)$_4$, Ti(OC(CH$_3$) CHCOCH$_3$)$_4$, Ti(O(CH$_2$)$_2$CH$_3$)$_2$(OC(CH$_3$)CHCOCH$_3$)$_2$, Ti(O(CH$_2$)$_3$CH$_3$)$_3$(OOC(CH$_2$)$_{16}$CH$_3$), Zr(OCH$_3$)$_4$, Zr(O (CH$_2$)$_3$CH$_3$)$_4$, Zr(O(CH$_2$)$_2$CH$_3$)$_4$, Zr(OC(CH$_3$) CHCOCH$_3$)$_4$, Zr(O(CH$_2$)$_3$CH$_3$)$_2$(OC(CH$_3$)CHCOCH$_3$)$_2$, Zr(OC(CH$_3$)CHCOCH$_2$CH$_3$)$_4$

Of them, preferred examples of the metallic or non-metallic organic compound of (VIII) are shown below.

Si(OCH$_3$)$_4$, Si(OCH$_2$CH$_3$)$_4$, Ti(O(CH$_2$)$_2$CH$_3$)$_2$(OC(CH$_3$) CHCOCH$_3$)$_2$

The metallic or non-metallic organic compound of formula (VII) or (VIII) is hydrolyzed similarly to the above-mentioned hydrolyzable silane derivatives to form a matrix composed of a metallic or non-metallic atom bonded to an oxygen atom. The matrix resulting from the compound (VII) or (VIII) exists sometimes uniformly and sometimes non-uniformly in the above-described silane matrix. Besides serving as a matrix-forming substance, the metal or non-metal exists in the matrix as a functional material. For example, titanium, germanium or boron as a metallic or non-metallic atom performs a function of regulating a refractive index in the matrix.

The metallic or non-metallic organic compound of formula (VII) or (VIII) is preferably used in an amount of from 0.01 to 80 mol % based on the silane derivative of formula (I).

In the present invention, an optically functional material is incorporated into the above-mentioned matrix comprising an Si—O covalent bond unit to produce an optical element.

The optically functional material which can be used in the present invention is at least one material selected from the group consisting of an organic material showing a nonlinear optical effect, a material showing a refractive index-regulating action, and an organic dye for laser oscillation.

The organic material showing a nonlinear optical effect which can be used in the present invention includes 4'-nitrobenzylidene-3-acetamino-4-methoxyaniline (MNBA), 2-methyl-4-nitroaniline (MNA), m-nitroaniline (m-NA), p-nitroaniline (p-NA), 4-diethylamino-4'-nitrostilbene (DEANS), 4-dimethylamino-4'-nitrostilbene (DANS), urea, an acridine compound (e.g., acridine), a condensed polycyclic aromatic hydrocarbon (e.g., pyrene), a rhodamine compound (e.g., Rhodamine 6G), a coumarin derivative (e.g., 7-hydroxy-4-methylcoumarin), a phthalocyanine derivative (e.g., sulfonated copper phthalocyanine), a naphthoquinone compound (e.g., naphthazarin), and a conjugated organic high molecular weight polymer (e.g., polydiacetylene and a polyarylenevinylene).

The organic material showing a nonlinear optical effect is preferably added in an amount of from $1 \times 10^{-7}$ to 75 mol %, more preferably $1 \times 10^{-4}$ to 30 mol % based on the hydrolyzable silane derivative of formula (I) or a combination of the hydrolyzable silane derivative of formula (I) and other hydrolyzable compounds of formulae (II) to (VIII) (hereinafter inclusively referred to as a silane derivative-containing hydrolyzable material).

Incorporation of the above-mentioned organic nonlinear optical material into the silane matrix may be carried out by once hydrolyzing the silane derivative-containing hydrolyzable material to form a porous gel and then diffusing therein an organic nonlinear optical material for adsorption as described in JP-A-63-151623. In this case, however, it is difficult to uniformly disperse the organic material throughout the gel due to insufficient permeability. Therefore, the following method is recommended. The silane derivative-containing hydrolyzable material and a prescribed amount of an organic nonlinear optical material are added to an appropriate solvent, such as water, an alcohol, an ether, an ester, an aliphatic hydrocarbon, an aromatic hydrocarbon or a halogenated hydrocarbon, or a mixture thereof to form a sol. In order to prevent cracking on drying, addition of a high-boiling solvent, such as formamide, dimethylformamide (DMF) or glycerin, as a drying controlling agent will be effective.

The resulting sol solution is allowed to gel in an appropriate container followed by drying, or the sol solution is coated on an appropriate substrate, allowed to gel, and dried. For use as an element, the sol solution is preferably coated on a substrate to form a thin film. Coating of the sol solution can be carried out by any known coating technique, such as dip coating and spin coating.

If desired, gelation may be accelerated by using a catalyst, such as an acid or a base, or by a heat treatment at a temperature of from 30° to 1000° C.

The thus prepared optical element comprises an organic nonlinear optical material dispersed and held in a matrix formed by polycondensation of the silane derivative-containing hydrolyzable material.

The material showing a refractive index-regulating action which can be used in the present invention as a functional material includes those for increasing a refractive index, such as titanium and germanium, and those for decreasing a refractive index, such as fluorine and boron.

The material showing a refractive index-regulating action is preferably added in an amount of from $1\times10^{-7}$ to 75 mol %, more preferably $1\times10^{-3}$ to 20 mol %, based on the silane derivative-containing hydrolyzable material.

Incorporation of these refractive index-regulating elements into the matrix can be carried out by, for example, a method comprising adding an alkoxide or a hydroxide of the element to be added to the silane derivative-containing hydrolyzable material in the course of hydrolysis (see JP-B-59-9499, the term "JP-B" as used herein means an "examined published Japanese patent application"), a method comprising dispersing fine particles of a compound containing the element to be added into a sol, a method comprising impregnating a solution of a compound containing the element to be added into a dried gel (see JP-A-4-7524), a method comprising sintering a gel in an atmosphere containing the element to be added, and a method comprising adding microcapsules of fine particles of a compound containing the element to be added (see JP-A-62-100428).

Incorporation of the above-mentioned material showing a refractive index-regulating action into the silane matrix may be carried out by once hydrolyzing the silane derivative-containing hydrolyzable material to form a porous gel and then diffusing therein an organic functional compound for adsorption as described in JP-A-63-151623. In this case, however, it is difficult to uniformly disperse the organic compound throughout the gel due to insufficient permeability. Therefore, the following method is recommended. The silane derivative-containing hydrolyzable material and a prescribed amount of an organic functional compound are added to an appropriate solvent, such as water, an alcohol, an ether, an ester, an aliphatic hydrocarbon, an aromatic hydrocarbon or a halogenated hydrocarbon, or a mixture thereof to form a sol. In order to prevent cracking on drying, addition of a high-boiling solvent, such as formamide, dimethylformamide (DMF) or glycerin, as a drying controlling agent will be effective.

The resulting sol solution is allowed to gel in an appropriate container followed by drying, or the sol solution is spun into fibers, or the sol solution is coated on an appropriate substrate, allowed to gel, and dried. For use as an element, the sol solution is preferably coated on a substrate to form a thin film or spun into fibers. Coating of the sol solution can be carried out by any known coating technique, such as dip coating and spin coating.

If desired, gelation may be accelerated by using a catalyst, such as an acid or a base, or by a heat treatment at a temperature of from 30° to 1000° C.

The thus prepared optical element according to the present invention comprises a material showing a refractive index-regulating action dispersed and held in a matrix formed by polycondensation of the silane derivative-containing hydrolyzable material.

The matrix having incorporated therein the refractive index-regulating material may further contain any other optically functional materials.

The organic dye for laser oscillation which can be used in the present invention is not limited as long as it imparts laser oscillating properties to a formed solid gel. Examples of suitable organic dyes are rhodamine dyes, such as Rhodamine 6G and Rhodamine B, coumarin dyes, such as 7-hydroxy- 4-methylcoumarin and 7-diethylamino-4-methylcoumarin, cyanine dyes, oxazine dyes, such as Cresyl Violet, stilbene derivatives, oxazole derivatives, oxadiazole derivatives, benzophenazoxanium derivatives and p-terphenyl derivatives.

The organic dye for laser oscillation is preferably added in an amount of from $1\times10^{-8}$ to 50 mol %, more preferably $1\times10^{-4}$ to 30 mol % based on the silane derivative-containing hydrolyzable material.

Incorporation of the above-mentioned organic dye into the silane matrix may be carried out by once hydrolyzing the silane derivative-containing hydrolyzable material to form a porous gel and then diffusing therein an organic dye for laser oscillation for adsorption as described in JP-A-63-151623. In this case, however, it is difficult to uniformly disperse the organic dye throughout the gel due to insufficient permeability. Therefore, the following method is recommended. The silane derivative-containing hydrolyzable material and a prescribed amount of an organic dye for laser oscillation are added to an appropriate solvent, such as water, an alcohol, an ether, an ester, an aliphatic hydrocarbon, an aromatic hydrocarbon or a halogenated hydrocarbon, or a mixture thereof to form a sol. In order to prevent cracking on drying, addition of a high-boiling solvent, such as formamide, dimethylformamide (DMF) or glycerin, as a drying controlling agent will be effective.

The resulting sol solution is allowed to gel in an appropriate container followed by drying, or the sol solution is coated on an appropriate substrate, allowed to gel, and dried. Coating of the sol solution can be carried out by any known coating technique, such as dip coating and spin coating.

If desired, gelation may be accelerated by using a catalyst, such as an acid or a base, or by a heat treatment at a temperature of from 30° to 1000° C.

The thus prepared optical element comprises an organic dye for laser oscillation dispersed and held in a matrix formed by polycondensation of the silane derivative-containing hydrolyzable material.

Selection of the silane derivative-containing hydrolyzable material used in the present invention, i.e., silane derivatives and metallic or non-metallic organic compounds represented by formulae (I) to (VIII), is basically arbitrary within the scope of the present invention. It should be noted, however, that these compounds show different rates of hydrolysis. Where a plurality of hydrolyzable components different in rate of hydrolysis are used in combination, if all of them are mixed before hydrolysis as in a conventional sol-gel process, the structure of the matrix obtained after gelation is decided by a component having a higher rate of hydrolysis, failing to obtain sufficient effects of the present invention as expected.

In order to solve the above problem, it is preferable to conduct hydrolysis stepwise for the individual component. That is, in a first step a component which is relatively slow in hydrolysis is mixed with water or a mixed solvent of water and an organic solvent, and the mixture is stirred and then allowed to stand for a prescribed period of time at an appropriately selected temperature to conduct partial hydrolysis. Thereafter, prescribed amounts of other silane derivatives and/or metallic or non-metallic organic compounds are added to the resulting sol solution either directly or in the form of a sol solution separately prepared by partial hydrolysis together with a functional material. The mixed system is allowed to undergo further hydrolysis to cause dehydrating condensation and gelation. According to this stepwise hydrolysis technique, there is formed an excellent inorganic matrix.

In the present invention, an electrical field may be applied from the outside for poling in order to orient the functional material selected from the group consisting of an organic material showing a non-linear optical effect, a material showing a refractive index-regulating action, and an organic dye for laser oscillation in a film. Examples of a means of applying an electrical field from the outside include (i) drying a sol solution inserted between two electrodes to cause the sol solution to gel and (ii) charging a surface of the film coated a sol solution by corona discharger. Of them, the above (ii) means, that is, corona poling is preferable. The electrical field strength in the above (i) or (ii) means is in the range of $1 \times 10^3$ to $1 \times 10^7$ Volt/cm, preferably $5 \times 10^4$ to $1 \times 10^6$ Volt/cm.

According to the present invention, since the silane derivative of formula (I) has one of the four hydrolyzable groups displaced with a non-hydrolyzable organic substituent containing not more than 4 carbon atoms, the resulting matrix has a reduced proportion of three-dimensional crosslinked bonds and thereby exhibits increased softness. As a result, the matrix hardly develops cracks on drying and, when coated on a substrate, forms a thin film having a sufficient thickness for use as an element. Further, the silane derivative with a non-hydrolyzable substituent shows reduced polarity in a gel state to exhibit improved compatibility with a functional material to be held therein. As a result, tendency of the functional material toward phase separation in the resulting element can be reduced.

The above-mentioned effects can further be enhanced by the combined use of the silane derivative represented by formula (II), (III) or (IV) having a hydrophobic group containing not less than 5 carbon atoms, i.e., $R^2$, $R^3$ or $R^5$, which has affinity to a functional material. In other words, the silane derivative of formula (II), (III) or (IV) forms an aggregate of micelles of the hydrophobic group in the matrix comprising a polycondensate of silane derivatives, and the micelles take in a functional material thereby making it possible not only to incorporate the functional material into the matrix at an increased concentration but to improve stability of the resulting optical element against heat or time.

Where the silane derivative of formula (V) or (VI) which contains two or three non-hydrolyzable groups is added in a small proportion, the softness of the resulting matrix can be controlled. At the same time, compatibility of the matrix with a functional material can also be controlled so as to prevent phase separation of the functional material.

Where the metallic or non-metallic compound of formula (VII) or (VIII) is added, the metallic or non-metallic compound is hydrolyzed to form bonds among the crosslinked silica gel network structures. That is, the crosslinked condition among the network structures can be controlled thereby making it possible to arbitrarily select the mechanical strength and denseness of a film formed from the gel. Therefore, the condensation reaction can be accelerated, and the mechanical strength of the resulting optical element can be increased.

Further, incorporation of an element for refractive index regulation into the matrix by diffusion or doping makes it possible to control refraction or transmission of light. When the optical element of the present invention is used as a thin film, the film preferably has a thickness of 0.01 to 200 µm, preferably 0.2 to 50 µm.

The present invention will now be illustrated in greater detail with reference to Examples, but the present invention should not be construed as being limited thereto. All the parts and percents are by weight unless otherwise indicated.

EXAMPLE 1

Two parts of dimethyldimethoxysilane (($CH_3)_2Si(OCH_3)_2$) were mixed with 1 part of ethanol and 0.2 part of 0.1N hydrochloric acid, and the mixture was refluxed at 50° C. for 2 hours to prepare a solution of partially hydrolyzed dimethyldimethoxysilane. To the solution were added 25 parts of methyltrimethoxysilane ($CH_3Si(OCH_3)_3$), 5 parts of ethanol, and 2 parts of a 0.02 mol/l butanol solution of MNA, and the mixture was stirred at room temperature for 2 hours to conduct further hydrolysis.

The resulting solution was coated on an ITO glass substrate by spin coating to form a thin film. Immediately after coating, the film was heated at 120° C. for 1 hour while being charged by applying a voltage of −70 kv by means of a corona discharger for poling. Referring to FIG. 1, a voltage from high-voltage D.C power supply 4 was applied to film 1 formed on ITO glass substrate 2 by means of corona discharger 3, and simultaneously film 1 was heated by means of heater 5. The film was once cooled and immersed in a 10 mol/l ethanol solution of titanium butoxide (Ti(O($CH_2)_3CH_3)_4$) for 4 hours. The film was then sintered in an electric furnace at 250° C. for 2 hours while introducing humid oxygen.

The resulting film had a thickness of 3.2 µm. The film assumed a transparent yellow color and was uniform and free from cracks.

Figure 2:
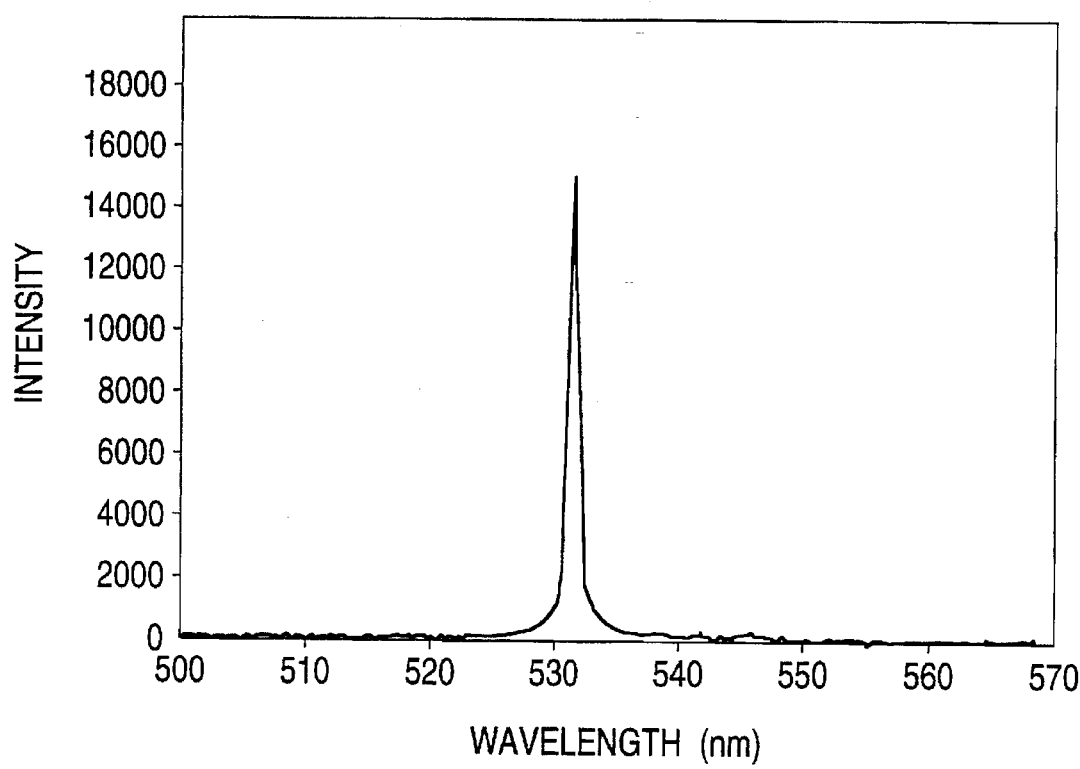
FIGS. 2 and 3 are each a spectrum of second harmonic oscillation of the film prepared in Examples 1 and 4, respectively.

In order to examine the nonlinear optical effect of the resulting film, pulsated light having a pulse width of 1.06 µm was irradiated using an Nd:YAG (yttrium alminium garnet) laser by prism coupling. As a result, second harmonic oscillation was observed at 532 nm as shown in FIG. 2, proving waveguiding characteristics of the film.

EXAMPLE 2

Five parts of octyltriethoxysilane ($C_8H_{17}Si(OCH_2CH_3)_3$) were mixed with 10 parts of ethanol and 2 parts of 0.1N hydrochloric acid, and the mixture was refluxed at 50° C. for 6 hours to prepare a solution of partially hydrolyzed octyltriethoxysilane.

Separately, 10 parts of tetraethoxysilane ($Si(OCH_2CH_3)_4$), 10 parts of ethanol, and 2 parts of 0.1N hydrochloric acid were mixed and refluxed at 50° C. for 3 hours to prepare a solution of partially hydrolyzed tetraethoxysilane.

The resulting two solutions were mixed together, and to the mixture were added 25 parts of methyltrimethoxysilane ($CH_3Si(OCH_3)_3$) and 7 parts of a 0.02 mol/l butanol solution of MNA, and the mixture was stirred at room temperature for 2 hours to conduct further hydrolysis.

An MNA-dispersed waveguiding film was prepared in the same manner as in Example 1, except for using the above-prepared solution.

The resulting film had a thickness of 2.6 µm. The film assumed a transparent yellow color and was uniform and free from cracks. Second harmonic oscillation at 532 nm was observed, proving waveguiding characteristics of the film.

Comparative Example 1

Twenty-five parts of tetraethoxysilane were mixed with 10 parts of ethanol and 5 parts of 0.1N hydrochloric acid, and the mixture was refluxed at 50° C. for 3 hours to obtain a solution of partially hydrolyzed tetraethoxysilane. To the solution was added 7 parts of a 0.02 mol/l butanol solution of MNA, followed by stirring at room temperature for 2 hours to conduct further hydrolysis.

An MNA-dispersed film was prepared in the same manner as in Example 1, except for using the above-prepared solution. The film underwent cracking immediately after coating and separated from the substrate in fine pieces and was unable to be further processed for production of a waveguiding film.

Comparative Example 2

Al MNA-dispersed film was prepared in the same manner as in Comparative Example 1, except for increasing the amount of ethanol to 30 parts. The coating solution was coated, dried, and sintered in the same manner as in Example 1 to form a thin film.

The resulting film had a thickness of 0.2 μm. Although freed from cracks, the film was non-uniform, and precipitation of fine MNA crystals was observed. When evaluated by incidence at right angles, second harmonic oscillation, though faint, was observed. However, when measured by prism coupling, no second harmonic oscillation was observed, indicating no waveguiding characteristics.

EXAMPLE 3

A coating solution was prepared in the same manner as in Example 2, except for using, as an organic functional compound, a 5% aqueous solution of a polysulfonium salt, a precursor of polyphenylenevinylene. The coating solution was coated on a slide glass by spin coating to form a thin film. Without conducting poling, the film was impregnated with a refractive index-regulating material (titanium butoxide solution) and sintered in the same manner as in Example 1.

The resulting film had a thickness of 7.2 μm. The film was transparent, uniform and free from cracks.

A nonlinear optical constant $\chi^{(3)}$ of the film was determined using an optical parametric oscillator exciting an Nd:YAG laser as a light source at a wavelength of 1.9 μm in accordance with a Maker fringe method. As a result, $\chi^{(3)}$ was found to be $8.2 \times 10^{-11}$ (esu).

The waveguiding characteristics at a wavelength of 1.06 μm were evaluated by prism coupling. As a result, the waveguide loss was 0.6 dB/cm, indicating very high waveguiding characteristics.

EXAMPLE 4

Two parts of dimethyldimethoxysilane were mixed with 1 part of ethanol and 0.2 part of 0.1N hydrochloric acid, and the mixture was refluxed at 50° C. for 2 hours to prepare a solution of partially hydrolyzed dimethyldimethoxysilane. To the solution were added 25 parts of methyltrimethoxysilane ($CH_3Si(OCH_3)_3$), 5 parts of ethanol, and 2 parts of a 0.02 mol/l butanol solution of MNA, and the mixture was stirred at room temperature for 2 hours to conduct further hydrolysis.

The resulting solution was coated on an ITO glass substrate by spin coating to form a thin film. Immediately after coating, the film was heated at 150° C. for 1 hour while being charged by applying a voltage of −70 kv by means of a corona discharger for poling in the same manner as in Example 1. The film was once cooled and then sintered in an electric furnace at 250° C. for 2 hours.

The resulting film had a thickness of 3.2 μm. The film assumed a transparent yellow color and was uniform and free from cracks.

Figure 3:
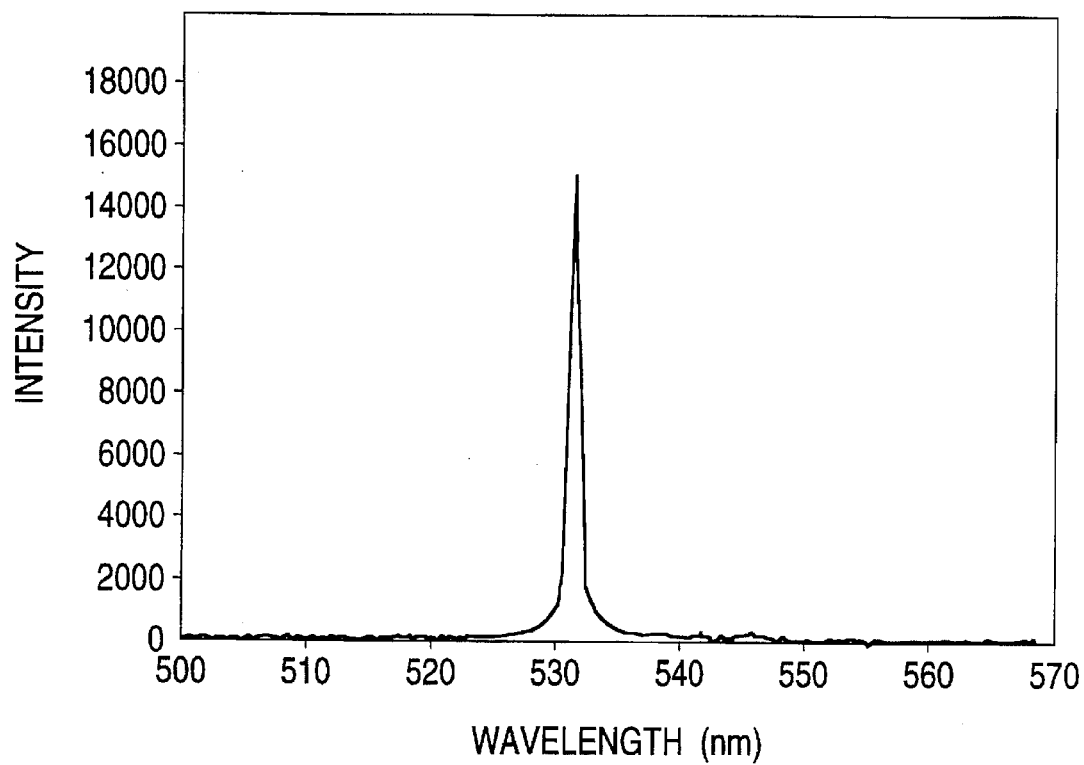

The nonlinear optical effect of the resulting film was examined in the same manner as in Example 1. As a result, second harmonic oscillation was observed at 532 nm as shown in FIG. 3, proving waveguiding characteristics of the film.

EXAMPLE 5

Five parts of octyltriethoxysilane were mixed with 10 parts of ethanol and 2 parts of 0.1N hydrochloric acid, and the mixture was refluxed at 50° C. for 6 hours to prepare a solution of partially hydrolyzed octyltriethoxysilane.

Separately, 10 parts of tetraethoxysilane ($Si(OCH_2CH_3)_4$), 10 parts of ethanol, and 2 parts of 0.1N hydrochloric acid were mixed and refluxed at 50° C. for 3 hours to prepare a solution of partially hydrolyzed tetraethoxysilane.

The resulting two solutions were mixed together, and to the mixture were added 25 parts of methyltrimethoxysilane ($CH_3Si(OCH_3)_3$) and 7 parts of a 0.02 mol/l butanol solution of MNA, and the mixture was stirred at room temperature for 2 hours to conduct further hydrolysis.

An MNA-dispersed film was prepared in the same manner as in Example 4, except for using the above-prepared solution.

The resulting film had a thickness of 2.6 μm. The film assumed a transparent yellow color and was uniform and free from cracks. Second harmonic oscillation at 532 nm was observed. Further, the film was very high mechanical strength.

EXAMPLE 6

Five parts of octadecyltriethoxysilane ($C_{18}H_{37}Si(OCH_2CH_3)_3$) were mixed with 10 parts of ethanol and 2 parts of 0.1N hydrochloric acid, and the mixture was refluxed at 50° C. for 8 hours to prepare a solution of partially hydrolyzed octadecyltriethoxysilane.

Separately, 2 parts of dimethyldimethoxysilane, 1 part of ethanol, and 0.2 part of 0.1N hydrochloric acid were mixed and refluxed at 50° C. for 2 hours to prepare a solution of partially hydrolyzed dimethyldimethoxysilane.

The resulting two solutions were mixed together, and to the mixture were added 25 parts of methyltrimethoxysilane and 7 parts of a 0.02 mol/l butanol solution of MNA, and the mixture was stirred at room temperature for 2 hours to conduct further hydrolysis.

An MNA-dispersed film was prepared in the same manner as in Example 4, except for using the above-prepared solution.

The resulting film had a thickness of 5.1 μm. The film assumed a transparent yellow color and was uniform and free from cracks. Second harmonic oscillation at 532 nm was observed.

Further, an MNA-dispersed film was prepared in the same manner as described above, except for using the MNA solution at a higher concentration (0.1 mol/l). The intensity of second harmonics observed was ten times that of the above-prepared film.

Comparative Example 3

Twenty-five parts of tetraethoxysilane were mixed with 10 parts of ethanol and 5 parts of 0.1N hydrochloric acid, and the mixture was refluxed at 50° C. for 3 hours to obtain a solution of partially hydrolyzed tetraethoxysilane. To the solution was added 7 parts of a 0.02 mol/l butanol solution of MNA, followed by stirring at room temperature for 2 hours to conduct further hydrolysis.

An MNA-dispersed film was prepared in the same manner as in Example 4, except for using the above-prepared solution. The film underwent cracking immediately after coating and separated from the substrate in fine pieces. Therefore, evaluation of the nonlinear optical effect could not be effected.

Comparative Example 4

An MNA-dispersed film was prepared in the same manner as in Comparative Example 3, except for increasing the amount of ethanol to 30 parts in the preparation of the coating solution. After coating, the obtained film was dried and sintered in the same manner as in EXAMPLE 4 to evaluate the non-linear optical effect.

The resulting film had a thickness of 0.2 µm. Although freed from cracks, the film was non-uniform, and precipitation of fine MNA crystals was observed.

EXAMPLE 7

A coating solution was prepared in the same manner as in Example 6, except for using, as a nonlinear optical material, a 0.02 mol/l ethanol solution of 4'-dimethylamino-N-methyl-4-stilbazolium. The coating solution was coated on a slide glass by spin coating to form a thin film. Without conducting poling, the film was dried and sintered in the same manner as in Example 6.

The resulting film had a thickness of 4.0 µm. The film assumed a transparent red color and was uniform and free from cracks.

A nonlinear optical constant $\chi^{(3)}$ of the film was determined in the same manner as in Example 3. As a result, $\chi^{(3)}$ was found to be $6.2 \times 10^{-13}$ (esu).

EXAMPLE 8

Five parts of octyltriethoxysilane ($C_8H_{17}Si(OCH_2CH_3)_3$) were mixed with 10 parts of ethanol and 2 parts of 0.1N hydrochloric acid, and the mixture was refluxed at 50° C. for 6 hours to prepare a solution of partially hydrolyzed octyltriethoxysilane.

Separately, 10 parts of tetraethoxysilane ($Si(OCH_2CH_3)_4$), 10 parts of ethanol, and 2 parts of 0.1N hydrochloric acid were mixed and refluxed at 50° C. for 3 hours to prepare a solution of partially hydrolyzed tetraethoxysilane.

The resulting two solutions were mixed together, and to the mixture were added 25 parts of methyltrimethoxysilane ($CH_3Si(OCH_3)_3$) and 7 parts of a 0.02 mol/l ethanol solution of 4-trifluoromethyl-7-diethylaminocoumarin, and the mixture was stirred at room temperature for 2 hours to conduct further hydrolysis.

A 4 ml portion of the resulting solution was put in a glass tube having an inner diameter of 12.5 mm and a height of 45 mm. The glass tube was sealed and allowed to stand at room temperature for gelation. With the glass tube being opened, the gel was dried at room temperature for 240 hours and then at 100° C. for 24 hours to form a cylindrical rod having a diameter of 4.9 mm and a height of 14 mm.

Figure 4:
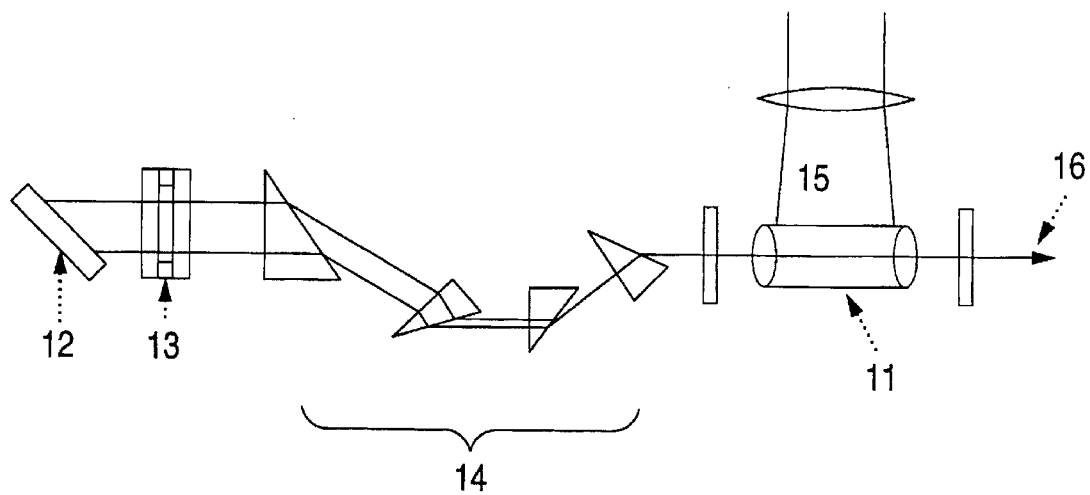
FIG. 4 is a schematic view of a dye laser using an optical element according to the present invention.

The cylindrical rod with its both ends polished was placed in a dye laser shown in FIG. 4. As shown in FIG. 4, rod 11 which is cylindrical was irradiated with light 15 for optical pumping from a nitrogen laser (LN1000, manufactured by PRA Co.) to cause laser oscillation, and the oscillation. Output beam 16 having a prescribed oscillation wavelength was measured with a laser power meter (L-PED, manufactured by PRA Co.). In FIG. 4, numerals 12, 13, and 14 are a grating, etalon, and a beam amplifier, respectively. As a result, an output of 170 µJ was obtained at an oscillation wavelength of 480 nm.

EXAMPLE 9

Five parts of octadecyltriethoxysilane were mixed with 10 parts of ethanol and 2 parts of 0.1N hydrochloric acid, and the mixture was refluxed at 50° C. for 8 hours to prepare a solution of partially hydrolyzed octadecyltriethoxysilane ($C_{18}H_{37}Si(OCH_2CH_3)_3$).

Separately, 3 parts of dimethyldimethoxysilane, (($CH_3)_2Si(OCH_3)_2$) 1 part of ethanol, and 0.2 part of 0.1N hydrochloric acid were mixed and refluxed at 50° C. for 2 hours to prepare a solution of partially hydrolyzed dimethyldimethoxysilane.

The resulting two solutions were mixed together, and to the mixture were added 25 parts of methyltrimethoxysilane ($CH_3Si(OCH_3)_3$) and 7 parts of a 0.02 mol/l ethanol solution of Nile Blue A perchlorate, and the mixture was stirred at room temperature for 2 hours to conduct further hydrolysis.

A cylindrical rod having a diameter of 5.5 mm and a height of 16 mm was prepared from the resulting solution in the same manner as in Example 8.

Laser oscillation was induced in the same manner as in Example 8. As a result, a laser output of 125 µJ was obtained at an oscillation wavelength of 690 nm.

EXAMPLE 10

Two parts of dimethyldimethoxysilane (($CH_3)_2Si(OCH_3)_2$) were mixed with 1 part of ethanol and 0.2 part of 0.1N hydrochloric acid, and the mixture was refluxed at 50° C. for 2 hours to prepare a solution of partially hydrolyzed dimethyldimethoxysilane. To the resulting sol solution were added 25 parts of methyltrimethoxysilane ($CH_3Si(OCH_3)_3$), 5 parts of ethanol, and 7 parts of a 0.02 mol/l butanol solution of Rhodamine 6G, and the mixture was stirred at room temperature for 2 hours to conduct further hydrolysis.

The resulting solution was coated on a substrate by spin coating and dried at 100° C. for 2 hours to form a thin film. The film formation was repeated several times to prepare a solid laser element.

The resulting film was irradiated with pulsated light of a nitrogen laser (power: 100 kW; pulse length: 5 ns) condensed through a cylindrical lens. As a result, a laser output of 115 µJ was obtained at an oscillation wavelength of 585 nm.

Comparative Example 5

Twenty-five parts of tetraethoxysilane were mixed with 10 parts of ethanol and 5 parts of 0.1N hydrochloric acid, and the mixture was refluxed at 50° C. for 3 hours to prepare a solution of partially hydrolyzed tetraethoxysilane. To the solution was added 7 parts of a 0.02 mol/l ethanol solution of 4-trifluoromethyl-7-diethylaminocoumarin, and the mixture was stirred at room temperature for 2 hours to conduct further hydrolysis.

A cylindrical rod having a diameter of 4.6 mm and a height of 15 mm was prepared from the resulting solution in the same manner as in Example 8.

Laser oscillation was induced in the same manner as in Example 8. As a result, a laser output of 46 µJ was obtained at an oscillation wavelength of 480 nm.

Comparative Example 6

A mixture of 25 parts of tetramethoxysilane, 10 parts of ethanol, 5 parts of 0.1N hydrochloric acid, and 7 parts of a 0.02 mol/l butanol solution of Rhodamine 6G was stirred at room temperature for 2 hours to conduct hydrolysis.

The resulting solution was coated on a substrate in the same manner as in Example 10, but cracks developed in the course of heating, and the film separated from the substrate in fine pieces. Therefore, evaluation on laser oscillation could not be carried out.

While the invention has been described in detail and with reference to specific examples thereof, it will be apparent to one skilled in the art that various changes and modifications can be made therein without departing from the spirit and scope thereof.

What is claimed is:

1. An optical element comprising:
    (i) a matrix having an Si—O covalent bond unit, wherein at least part of the silicon atoms of said Si—O covalent bond unit is covalently bonded to an aliphatic hydrocarbon group containing not more than 4 carbon atoms, and
    (ii) at least one functional material selected from the group consisting of an organic material showing a nonlinear optical effect, a material showing a refractive index-regulating action, and an organic dye for laser oscillation, said functional material being present within said matrix;
    said matrix having, as part of said matrix, at least one silicon atom bonded to an aliphatic hydrocarbon group containing not less than 5 carbon atoms, which forms aggregates of micelles in said matrix that contain said at least one functional material, said functional material being uniformly dispersed throughout the matrix.

2. An optical element as claimed in claim 1, which further contains a second matrix comprising a covalent bond unit of a trivalent or tetravalent metallic or non-metallic element and an oxygen atom.

3. A process for producing an optical material comprising:
    (i) mixing a silane derivative represented by formula (I):

$$R^1SiX^1_3 \quad (I)$$

wherein $R^1$ represents an aliphatic hydrocarbon group having not more than 4 carbon atoms; and $X^1$ represents an alkoxyl group, a halogen atom or an isocyanate group; at least one functional material selected from the group consisting of an organic material showing a non-linear optical effect, a material showing a refractive index-regulating action, and an organic dye for laser oscillation; and an organic solvent,
    (ii) hydrolyzing said silane derivative, and
    (iii) causing the resulting sol solution to gel;
    said method further comprising mixing with said gel containing said hydrolyzed silane derivative at least one additional derivative selected from the group consisting of the following:

$$R^2SiX^2_3 \quad (II)$$

$$\begin{array}{c} R^3 \\ \phantom{x}\diagdown \\ \phantom{xx}SiX^3_2 \\ \phantom{x}\diagup \\ R^4 \end{array} \quad (III)$$

$$\begin{array}{c} R^6 \\ | \\ R^5-SiX^4 \\ | \\ R^7 \end{array} \quad (IV)$$

$$\begin{array}{c} R^8 \\ \phantom{x}\diagdown \\ \phantom{xx}SiX^5_2 \\ \phantom{x}\diagup \\ R^9 \end{array} \quad (V)$$

$$\begin{array}{c} R^{11} \\ | \\ R^{10}-SiX^6 \\ | \\ R^{12} \end{array} \quad (VI)$$

$$M^1(X^7)_m L^1_{3-m}, \quad (VII)$$

and $$M^2(X^8)_n L^2_{4-n} \quad (VIII)$$

wherein $X^2$, $X^3$, and $X^4$ each represent an alkoxyl group, a halogen atom or an isocyanate group;

$R^2$, $R^3$, and $R^5$ each represent a substituted or unsubstituted and saturated or unsaturated aliphatic hydrocarbon group containing not less than 5 carbon atoms, inclusive of the number of carbon atoms in the substituents if any, or a substituted or unsubstituted aryl group containing not less than 5 carbon atoms; $R^4$, $R^6$, and $R^7$ each represent a substituted or unsubstituted and saturated or unsaturated aliphatic hydrocarbon group or a substituted or unsubstituted aryl group;

$R^3$ and $R^4$ or two of $R^5$, $R^6$ and $R^7$ may be taken together to form a carbonaceous ring or a heterocyclic ring;

$X^5$ and $X^6$ each represent an alkoxyl group, a halogen atom or an isocyanate group;

$R^8$, $R^9$, $R^{10}$, $R^{11}$ and $R^{12}$ each represent a substituted or unsubstituted and saturated or unsaturated aliphatic hydrocarbon group containing not more than 4 carbon atoms; wherein $M^1$ represents a trivalent metallic or non-metallic atom which is an element selected from the group consisting of Group $III_A$, Group $III_B$ and Group $V_B$;

$M^2$ represents a tetravalent metallic or non-metallic atom which is an element selected from the group consisting of Group $IV_A$ and Group $IV_B$;

$X^7$ and $X^8$ each represent a halogen atom, a hydroxyl group, an isocyanate group or an alkoxyl group;

$L^1$ and $L^2$ each represent a chelating group or $R^{13}$—COO—, $R^{13}$ representing an alkyl group;

m represents 0 or an integer of from 1 to 3; and n represents 0 or an integer of from 1 to 4.

4. A process as in claim 3, wherein the gel comprises the organic material showing a non-linear optical effect and gelation is conducted by applying an electrical field to the sol solution.

5. A process as in claim 3, wherein said derivatives represented by formula (I) comprise:
$CH_3Si(OCH_3)_3$,
$CH_3Si(OCH_2CH_3)_3$,
$CH_3CH_2Si(OCH_3)_3$,
$CH_3CH_2Si(OCH_2CH_3)_3$,
$CH_3(CH_2)_2Si(OCH_3)_3$,
$CH_2=CHCH_2Si(OCH_3)_3$,
$CH_2=CHCH_2Si(OCH_2CH_3)_3$,
$CF_3(CH_2)_2Si(OCH_3)_3$ or
$CF_3(CH_2)_2Si(OCH_2CH_3)_3$.

6. A process as in claim 3, wherein $X^2$, $X^3$ or $X^4$ has not more than 3 carbon atoms;

$R^2$, $R^3$ or $R^5$ has 8 to 18 carbon atoms;
$R^4$, $R^6$ or $R^7$ has 1 to 6 carbon atoms;
said carbonaceous ring has 3 to 5 carbon atoms;
said heterocyclic ring has 6 carbon atoms and contains at least one hetero atom; and
said alkoxyl group has not more than 3 carbon atoms.

7. A process as in claim 3, wherein $R^2$, $R^3$, or $R^5$ represent a phenyl group, a methacryl, a mercapto group, an epoxy group, a halogen atom, or an amino group;

$R^4$, $R^6$ or $R^7$ represented a halogen atom, an amino group, or a cyano group; and $R^8$, $R^9$, $R^{10}$, $R^{11}$ or $R^{12}$ represent a halogen atom, an amino group or a cyano group.

8. A process as in claim 3, wherein said at least One additional derivative of formula (II) comprises:
$CH_3(CH_2)_7Si(OCH_3)_3$,
$CH_3(CH_2)_7Si(OCH_2CH_3)_3$,
$CH_3(CH_2)_{11}Si(OCH_3)_3$,
$CH_3(CH_2)_{11}Si(OCH_2CH_3)_3$,
$CH_3(CH_2)_{15}Si(OCH_3)_3$,
$CH_3(CH_2)_{15}Si(OCH_2CH_3)_3$,
$CH_3(CH_2)_{17}Si(OCH_3)_3$,
$CH_3(CH_2)_{17}Si(OCH_2CH_3)_3$,
$F_3C(CF_2)_5(CH_2)_2Si(OCH_3)_3$ or
$F_3C(CF_2)_5(CH_2)_2Si(OCH_2CH_3)_3$.

9. A process as in claim 3, wherein said at least one additional derivative of formula (III) comprises:
$CH_3(CH_2)_7Si(CH_3)(OCH_2CH_3)_2$,
$CH_3(CH_2)_7Si(CH_3)(OCH_3)_2$,
$CH_3(CH_2)_{11}Si(CH_3)(OCH_3)_2$,
$CH_3(CH_2)_{17}Si(CH_3)(OCH_3)_2$ or
$F_3C(CF_2)_5(CH_2)_2Si(CH_3)(OCH_3)_2$.

10. A process as in claim 3, wherein said at least one additional derivative of formula (IV) comprises:
$CH_3(CH_2)_5Si(CH_3)_2(OCH_3)$,
$CH_3(CH_2)_5Si(CH_3)_2(OCH_2CH_3)$,
$(CH_3(CH_2)_5)_2Si(CH_3)(OCH_3)$,
$(CH_3(CH_2)_5)_3Si(OCH_3)$,
$CH_3(CH_2)_7Si(CH_3)_2(OCH_3)$,
$CH_3(CH_2)_{11}Si(CH_3)_2(OCH_3)$,
$CH_3(CH_2)_{17}Si(CH_3)_2(OCH_3)$,
$H_2N(CH_2)_{11}Si(CH_3)_2(OCH_3)$,
$F_3C(CF_2)_5(CH_2)_2Si(CH_3)_2(OCH_3)$,

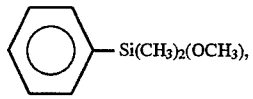

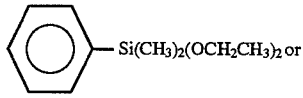

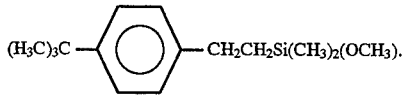

11. A process as in claim 3, wherein said at least one additional derivative of formula (V) comprises:
$(CH_3)_2Si(OCH_3)_2$,
$(CH_3)_2Si(OCH_2CH_3)_2$,
$(CH_2CH_3)_2Si(OCH_3)_2$,
$(CH_2CH_3)_2Si(OCH_2CH_3)_2$,
$(CH_2=CH)_2Si(OCH_3)_2$ or
$(CH_2=CH)_2Si(OCH_2CH_3)_2$.

12. A process as in claim 3, wherein said at least one additional derivative of formula (VI) comprises:
$(CH_3)_3Si(OCH_3)$,
$(CH_3)_3Si(OCH_2CH_3)$,
$(CH_2CH_3)_3Si(OCH_3)$,
$(CH_2CH_3)_3Si(OCH_2CH_3)$ or
$(CH_3(CH_2)_2)_3Si(OCH_3)$.

13. A process as in claim 3, wherein said at least one additional derivative of formula (VII) comprises:
$Al(OC(CH_3)CHCOCH_3)_3$,
$Al(OC(CH_3)_3)_2(OC(CH_3)CHCOCH_3)$ or
$Y(OC(CH_3)CHCOCH_3)_3$.

14. A process as in claim 3, wherein said at least one additional derivative of formula (VIII) comprises:
$Si(OCH_3)_4$,
$Si(OCH_2CH_3)_4$ or
$Ti(O(CH_2)_2CH_3)_2(OC(CH_3)CHCOCH_3)_2$.

15. A process for producing an optical material comprising (i) hydrolyzing a first silane derivative to form a sol solution; (ii) mixing the resulting sol solution with a second silane derivative or a hydrolyzate thereof, at least one functional material selected from the group consisting of an organic material showing a nonlinear optical effect, a material showing a refractive index-regulating action and an organic dye for laser oscillation, and an organic solvent; (iii) further hydrolyzing the mixture; and (iv) causing the resulting sol solution to gel.

16. An optical material produced by the process of claim 15.

17. An optical element comprising:
(i) a matrix having an Si—O covalent bond unit, wherein at least part of the silicon atoms of said Si—O covalent bond unit is covalently bonded to an aliphatic hydrocarbon group containing not more than 4 carbon atoms, and
(ii) at least one functional material selected from the group consisting of an organic material showing a nonlinear optical effect, a material showing a refractive index-regulating action, and an organic dye for laser oscillation, said functional material being present within said matrix;
said matrix having, as part of said matrix, at least one silicon atom bonded to a substituent selected from the group consisting of an aliphatic hydrocarbon group containing not less than 5 carbon atoms, an aryl group containing not less than 5 carbon atoms, a carbonaceous ring, and a heterocyclic ring, which forms aggregates of micelles in said matrix that contain said at least one functional material, said functional material being uniformly dispersed throughout the matrix,
wherein said matrix comprises at least one silicon atom bonded to two or three hydrocarbon groups.

* * * * *